(12) United States Patent
Hansen et al.

(10) Patent No.: US 7,011,778 B2
(45) Date of Patent: Mar. 14, 2006

(54) METHOD AND INSTALLATION FOR PRODUCING SUBSTRATE BLOCKS

(75) Inventors: Lars Hansen, Vejen (DK); Øjvind Ellegaard, Esbjerg (DK)

(73) Assignee: Ellegaard A/S, Esbjerg N (DK)

( * ) Notice: Subject to any disclaimer, the term of this patent is extended or adjusted under 35 U.S.C. 154(b) by 57 days.

(21) Appl. No.: 10/474,365

(22) PCT Filed: Apr. 11, 2002

(86) PCT No.: PCT/DK02/00243

§ 371 (c)(1),
(2), (4) Date: Mar. 3, 2004

(87) PCT Pub. No.: WO02/082886

PCT Pub. Date: Oct. 24, 2002

(65) Prior Publication Data

US 2004/0250701 A1    Dec. 16, 2004

(30) Foreign Application Priority Data

Apr. 11, 2001    (DK) .............................. 2001 00610

(51) Int. Cl.
*B29C 43/00*    (2006.01)

(52) U.S. Cl. ...................... 264/118; 264/123; 425/308; 425/461

(58) Field of Classification Search ................ 264/118, 264/112, 123; 425/308, 461
See application file for complete search history.

(56) References Cited

U.S. PATENT DOCUMENTS 5,382,403 A    1/1995    Ellegaard

FOREIGN PATENT DOCUMENTS

| DE | 29 09 488 A1 | 9/1980 |
| GB | 2 061 905 A | 5/1981 |
| WO | WO 01/19165 A1 | 3/2001 |

*Primary Examiner*—Mary Lynn Theisen
(74) *Attorney, Agent, or Firm*—David S. Safran

(57) ABSTRACT

The present invention relates to a method and an installation for producing growth substrate blocks, particularly for blocks for cuttings for horticultural use, where loose substrate material is compacted in a forming chamber (18) and thus forms useable block bodies. With the present invention a compulsory moistening of the blocks with suitably heated water is performed, after which these are made ready for use almost immediately, so that an actual conditioning no longer is necessary or can be reduced considerably. The blocks can be moistened and heated from the inside to a desired temperature in a both quick and energy saving way. The moistener, which preferably is water, can contain various additives such as nutrients or the like.

13 Claims, 3 Drawing Sheets

METHOD AND INSTALLATION FOR PRODUCING SUBSTRATE BLOCKS

The present invention relates to a method and an installation for producing growth substrate blocks, particularly blocks for cuttings for horticultural use, applying a known basic technique, wherein mainly loose material from a supply of substantially loose substrate material such as sphagnum is fed into a forming chamber for compacting and, subsequently, the material is removed in compacted block or string form for the purpose of forming useable block bodies, if necessary by cutting the block or string formations, which have been formed.

An example of such a known basic technique is disclosed in WO 92/03914 in which the loose material is sucked into the forming chamber via a hose or pipe, as the forming chamber is provided as a cylindrical piece with a perforated wall through which air from a surrounding suction chamber is sucked into one end of the forming chamber via a pipe/hose connection from the mentioned supply of material, while the opposite end of this chamber continuously is kept closed by the material which already has been compacted when it is sucked in and which successively is removed from the forming chamber precisely through the opposite end thereof.

DE 29 09 488 describes forming of sphagnum blocks in a compression chamber where the sphagnum is transported and compressed by rotating helical screw means. Moisture is added to the sphagnum near the inlet by the end of the rotating helical screw, and moistened sphagnum is compressed and formed. In this way the sphagnum will in the beginning comprise most of the water as droplets without moistening the sphagnum, and first after a relative long time period the sphagnum will become moistened. For that reason this method is ineffective in mass production of plant blocks.

WO 01/19165 relates to a method and an apparatus for determining the moisture content of bulk material, in particular potting soil, wherein the volume of a quantity of bulk material is determined, the weight of the quantity of bulk material is determined, the specific density is then determined from the volume and the weight, and finally the moisture content is determined by comparison with a table. The invention further relates to a method and an apparatus for preparing bulk material, in particular potting soil, with a predetermined moisture content, wherein the volume of a quantity of bulk material is determined, the weight of the quantity of bulk material is determined, and water is then added to the quantity of bulk material until the weight associated with the desired moisture content is obtained.

This document only concerns filling a defined amount of prepared sphagnum in a box. If the sphagnum is dry, water is added to a mixing process in order to reach correct water content in the prepared sphagnum.

In order for the fed material to be handled with a mere minimum of ease it is imperative that it is provided in a loose and therefore relatively dry form, as a wet sphagnum mass is much more difficult and thereby much more expensive to form into suitable shapes. On the other hand, with regard to the practical use of the block bodies it is absolutely imperative that the blocks are provided in a practically soaked condition at a temperature of about 18–25° C. In praxis this is done by placing the automatically produced substrate blocks, which are provided to relevant horticultures in a very large number, on greenhouse tables with bilge-water coverage, thus enabling the blocks partly to absorb the bilge-water and partly to assume the desired higher temperature from the heated greenhouse atmosphere.

This praxis is connected with considerable costs which according to the present invention can be reduced significantly by providing a compulsory moistening of the blocks with an appropriately heated moistener, such as water or wet steam, in immediate connection to the introduction of the blocks to the greenhouse system, preferably by establishing an infeed and treatment station from which the blocks successively are fed to the greenhouse in a number of rows, which possibly could pass an in-line mounting area for the cuttings in the blocks, so that these subsequently are transported directly to the regular grow area(s) for the cuttings.

As the block bodies are fairly tightly compacted they are both slowly water absorbent and poorly heat conducting and this is why, according to the usual practise, it is necessary to utilise greenhouse space for the above mentioned conditioning of the blocks, typically over a 1–2 day period. As the number of blocks may reach as high as tens of thousands, a rather large greenhouse area must, thus, be reserved for this purpose and the supplied heat energy is relatively poorly utilised.

The scope of the invention is to achieve a fast and effective preparation and moistening of blocks for cuttings, forming a high number of cutting blocks pr. hour for industrial greenhouse facilities.

This can be achieved with the present invention as a compulsory moistening of the blocks with suitably moisture medium heated water, for example by injecting the warmed water into the blocks, makes these ready for use almost immediately, so that the special conditioning area no longer is necessary or can be reduced to a short passage. The blocks are both moistened and heated from the inside, so that a moistening process to a desired temperature can take place both quickly and with a minimum of heating energy. Furthermore, the moistener, which preferably is water, can contain various additives such as nutrients and the like.

Another significant circumstance is the fact that in the indicated production line it will be possible to shape the block bodies with a traditional prick opening for easy receipt of the cuttings after the block has been largely wetted. Usually, these prick openings are performed in the mechanical installation for the shaping of the blocks and it is a well-known observation that these prick openings are more or less closed when the cutting are received, which to a large degree counteracts an easy mounting of the cuttings which are relatively fragile.

In connection with the present invention a significant side effect from performing the prick opening as a final operation in shaping of the block and/or moistening unit has appeared, as it has been found that the prick openings remain intact or open when provided in the already moistened block bodies, even if the moistening is not yet totally homogeneous. When the moistening merely has advanced noticeably, the remaining swelling of the block material will not have a closing effect of the prick openings and the cuttings will, thus, be so easy to mount that the manual mounting is considerably relieved and, thus, it is to a wide extent possible to speculate in devices for an automatic mounting of cuttings in said prick openings.

The starting point of the present invention is that it has been found possible to simply and quickly evoke a sufficient moistening of the block material, namely when this takes place in direct continuation of the shaping of the block material as such. It is still imperative that the fed material is loose and relatively dry, but once the material has been compacted it is easily handled when removed in block or string form in wet condition.

Therefore according to the present invention it is possible that a moistener can be fed to the material in the compacting area during the shaping process, while the material still is loose and willingly is moistened during its movement towards the compacting area and where the moistener in connection with the infeed is distributed in the forming chamber by underpressure.

Another observation is the fact that water is fed continuously to the "rear end area" of the block or block string which is being shaped, so that every cross section hereof is subjected to active moistening. The shaping must take place with a distinct speed, but the material is suited for maintaining infed excess water, which, subsequently, is given more time to be absorbed in the material by capillary effect.

In a preferred method of producing the blocks, confer for example with the above mentioned WO document, a width of air permeable paper is added to the infeed of the loose material, whereby said paper is continuously rounded up in order to created an outer holster around the produced blocks as these are cut off from the formed string. The paper width will, thus, surround the passage where the loose material is conveyed to the forming chamber and it will, typically, be near the inner end of this passage that the water is preferably introduced. This is hardly doable through the paper casing, but it has been found fully realistic to convey the water through a pipe or a hose which has been led into the material infeed opening before the infeed area for the paper casing and which extends towards the inside area at the infeed of the forming chamber. There is no need for any special centring or fastening of this water infeed when this ends shortly before the forming chamber, as the infed material thus still can be distributed fairly evenly across the cross section of the formed block material, even though the deposited material now is significantly water carrying.

However, it must be mentioned that is has been found particularly advantageous to arrange the water supply via a freely hanging hose in connection with a vertical inwardly directed infeed of the infeed material to the forming chamber, which equally can be vertically oriented with the inherent advantage that the removed block material can be led directly into receiving cells in underlying, horizontally conveyed mounting trays for delivery to the greenhouse. Thus, is will also be increasingly possible to use particular additives such as perlite or clay as the blocks are erect in their surrounding paper casing during the entire process.

The loose infeed material will often be colder than the greenhouse temperature and in this case it will be relevant to use extra heated water, for example at 60-70° C., in order to quickly achieve the desired temperature in the wet blocks. At this or at even higher temperatures a thermal sterilising effect on the material can be achieved and as the material is led directly to the greenhouse, the used heat energy will be regained via the transfer of heat to the air. Furthermore, the moistener can contain additives, which cause a chemical sterilisation of the material.

The entire process can take place practically without any waste of water, which is of great importance for an effective utilisation of various additives to the water.

The shaping of the above mentioned prick openings ("pricking out holes") can take place using already known means in the form of a double piston which is rested against the top of the block, after which the gudgeon pin is activated for a quick down and up shooting in order to form the hole. This technique is fully useable regardless of the fact that the blocks are decidedly wet and, as mentioned, is has been found that the holes in the wet material furthermore are particularly form stabile.

While the starting point of the invention is the successive moistening of the block material during the shaping of the blocks, the derived immediate infeed of the blocks to the greenhouse has shown such great advantages that the invention also will cover this aspect, regardless of whether other methods of moistening are used, for example injection of water or wet steam or a forced application of such in the already shaped blocks. The shaping of the blocks per se will thus not be confined to take place in connection to the greenhouse installation.

In the following the invention is described with reference to the drawing which, without being limiting, indicates a preferred embodiment of an installation for producing growth substrate blocks according to the invention where:

Figure 1:
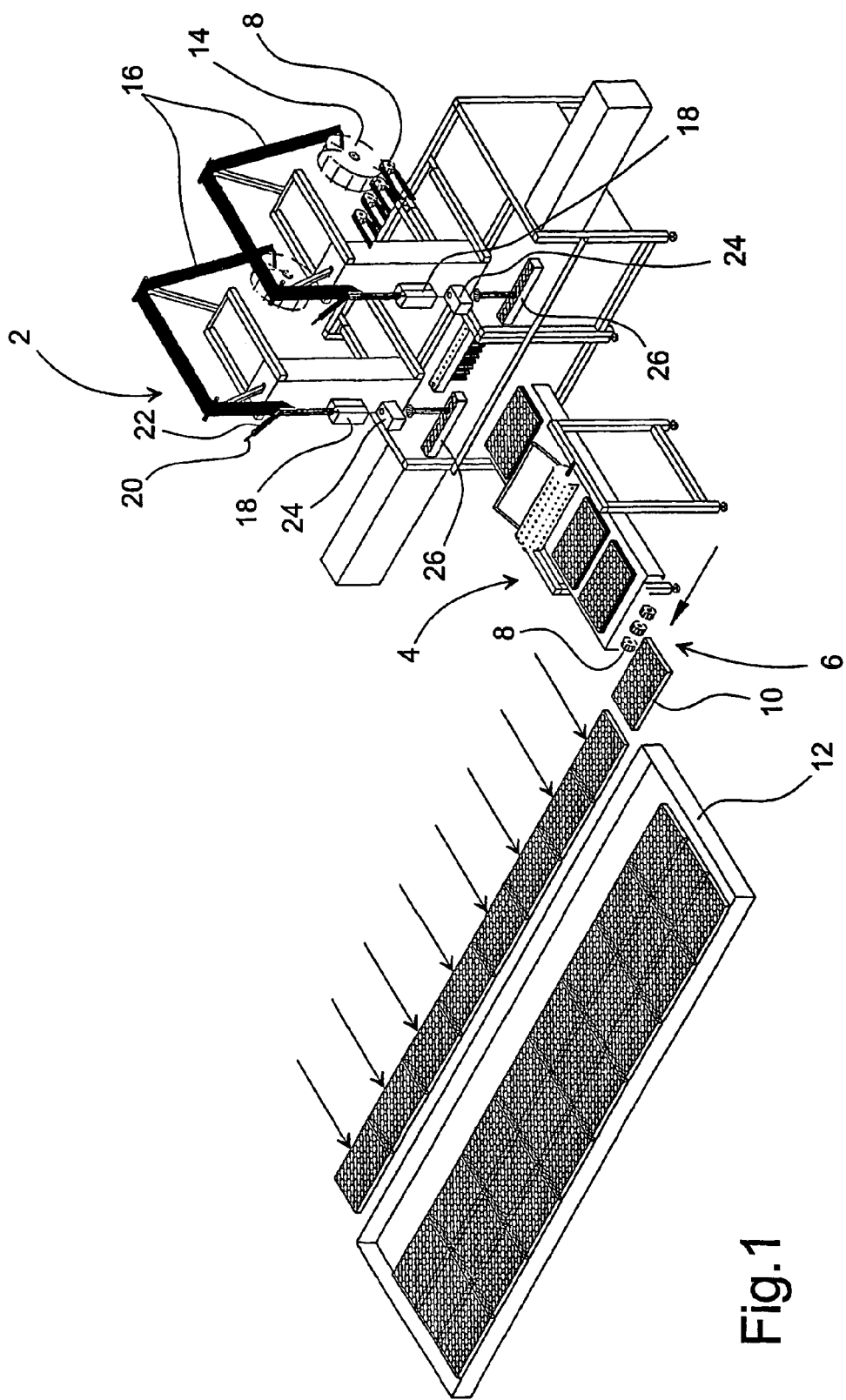
FIG. 1 is a situation drawing of an entire installation.

In FIG. 1 is shown an entire installation for producing moistened growth substrate blocks. The installation comprises a fully automatic substrate potting machine 2, a pricking out machine 4 and a transfer unit 6, all connected to a system of conveyer belts 8. From the transfer unit 6 the substrate blocks, which are placed in trays 10, are conveyed to a greenhouse table 12. In an alternative embodiment not shown a further machine for automatic placement of cuttings is comprised.

As can be seen in FIG. 1 a width 16 of air permeable paper is led from a reel 14 to the forming section as such. This paper width 16 is formed to an "endless tube", which via vacuum is filled with substrate in the forming chamber 18. Prior to the area where said paper width 16 is joined to a tube, a hose 20 or a pipe is led into the infeed 22 for the substrate material. Through this hose/pipe 20 the moistener in the form of water or steam can be feed to the block, possibly with at an increased temperature and this moistener can, furthermore, contain nutrients, fungicides or other additives which are preferably added in liquid form.

After the forming of the substrate blocks and the placement of these in trays 10 they are conveyed to a pricking out machine 4, where holes for the receipt of cuttings are made. These cuttings can be placed manually or, as mentioned, with an automatic placing machine. Finally, the trays 10 with substrate blocks are transferred to greenhouse tables 12 in a greenhouse.

Figure 2:
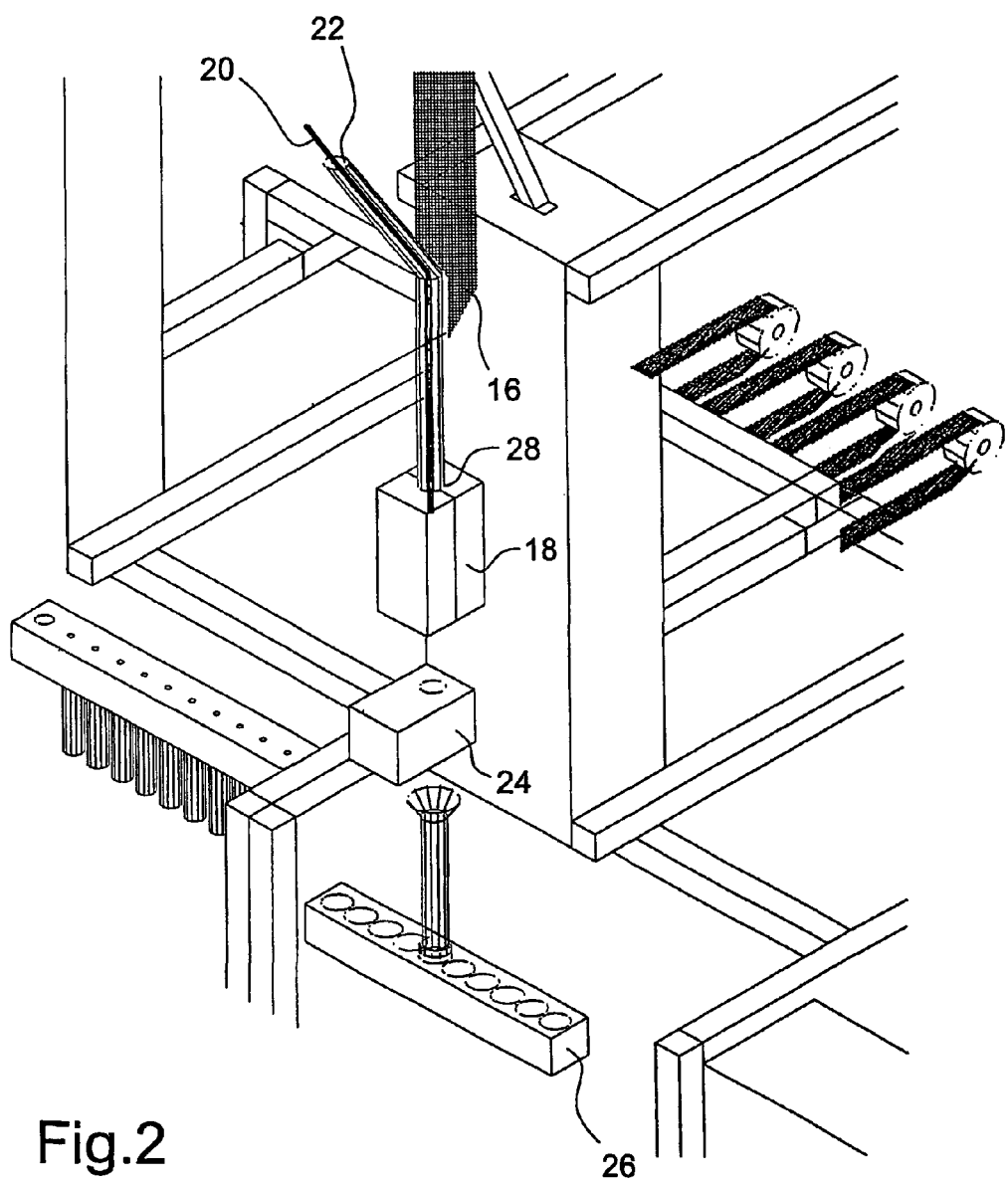
FIG. 2 is a partial drawing indicating the area around the forming chamber.

In FIG. 2 the area with the forming chamber 18 is shown in more detail, where the infeed pipe 22 for loose substrate material is connected with the forming chamber 18 per se. The paper width 16, from which an endless air permeable pipe is formed, is indicated as a "shadow" at the infeed pipe 22 and is formed into a tube surrounding this. Immediately above the connection point for the paper width 16 a hose/pipe 20 for the moistener is led to into the infeed pipe 22. The amount of infed moistener is controlled from a not shown control unit which, furthermore, comprises pumps and heating means. The infeed of the moistener is, normally, time controlled so that a pump is left running or a valve is opened for a certain amount of time, which thus conveys a measured amount for injection into the substrate block in question. The amount of infed moistener is regulated by control weighing of a useable and filled "wet" tray 10, where the weight of this is compared to a useable and filled "dry" tray.

Under the forming chamber 18 a forwarding device 24 is indicated, which pulls a new length from the paper pipe forward for filling and, at the same time, pushes the filled paper casing down for cutting at an appropriate height. Subsequently, by using a displaceable dispository unit 26 a whole row of substrate blocks is placed in a suitable tray 10.

Figure 3:
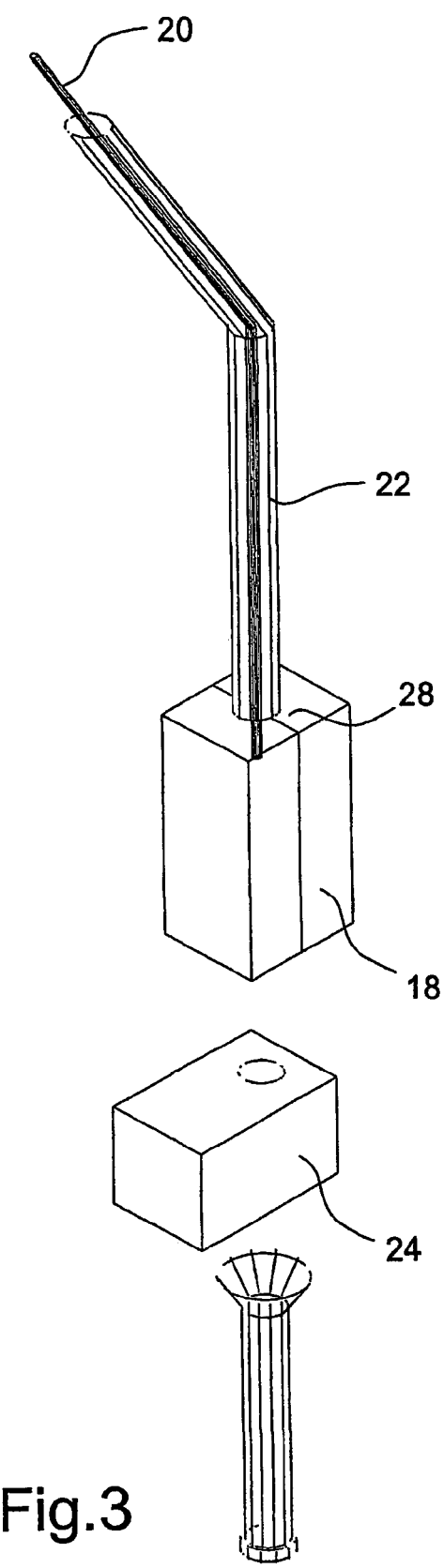
FIG. 3 shows the arrangement of infeed hose/pipe for the moistener.

FIG. 3 indicates the profile of the forming chamber 18 and inside this is shown a freely hanging hose 20 through which the moistener is infeed. The hose 20 can, in other embodiments of the machine 2, be replaced by a stiff pipe which operates in the same way as the hose 20 shown here. When the forming chamber 18 is closed and an underpressure is created there is opened for the infeed of a "shot" of moistener, which is distributed quickly in the substrate material because of the mentioned underpressure. It is, furthermore, likely that the created underpressure can neutralise mosquito larva, as they are expected to be killed by this.

What is claimed is:

1. Method of producing growth substrate blocks for horticultural use, wherein a loose material from a supply of substantially loose substrate material is fed into a forming chamber for compacting and, subsequently, the material is removed in compacted string form for the purpose of forming useable block bodies, by cutting the strings into blocks, wherein the method comprises a compulsory moistening of the strings, with a heated moisture medium prior to the cutting of the strings into blocks and before the introduction of the blocks into a greenhouse system, by establishing an infeed and treatment station from which the blocks successively are fed to the greenhouse system in a number of rows, which pass an in-line mounting area for the cuttings in the blocks, after which the blocks with the mounted cuttings are transported directly to the regular grow area(s) for the cuttings.

2. Method according to claim 1, wherein a moistener medium is fed to the material in the compacting area during the shaping process, while the material still is loose and willingly is moistened during its movement towards the compacting area, and where the moistener in connection with the infeed is distributed in the block in the forming chamber by underpressure.

3. Method according to claim 1, wherein the infeed of moisture medium takes in place in connection with a vertical inwardly directed infeed of the infeed material to the forming chamber, which equally is vertically oriented and from which the removed block material is led directly into receiving cells in underlying, horizontally conveyed mounting trays for delivery to the greenhouse.

4. Method according to claim 1, wherein the infed moisture medium has a temperature between 5° C. and 90° C.

5. Method according to claim 1, wherein the mounting of the cuttings in prick openings in question is fully automated.

6. Method according to claim 1, wherein one of perlite and clay are added to the substrate material in the block bodies.

7. Installation for producing growth substrate blocks for horticultural use, wherein the installation from a supply of substantially loose substrate material is fed loose material in a forming chamber for compacting and subsequent removal of the material in a compacted string form for the purpose of forming useable block bodies by cutting the strings into blocks, wherein the installation comprises means for compulsory moistening of the strings with a heated moisture medium during the compacting process in the forming chamber.

8. Installation according to claim 7, wherein it comprises means for heating the moisture medium prior to the infeed of this to the block bodies.

9. Installation according to claim 7, wherein the means for compulsory moistening are comprised of a pipe or a hose, which has been led into the material infeed pipe prior to the infeed area for an air permeable paper width, which surrounds already shaped strings, where said pipe or hose inside the infeed pipe extends to the area at the infeed end of the forming chamber.

10. Installation according to claim 7, wherein means for supplying moisture medium are arranged in connection with n vertical inwardly directed infeed of the infeed material to the forming chamber, where the forming chamber is vertically oriented and from which the block material with the use of placing means is led directly into receiving cells in underlying, horizontally conveyed receiving trays.

11. Installation according to claim 7, further comprising means for a fully automated mounting of cuttings in prick openings in the block bodies.

12. Method according to claim 1, wherein the infed moisture medium has a temperature between 18° C. and 70° C.

13. Method according to claim 1, wherein the substrate material is sphagnum.

* * * * *